United States Patent
Sinha

(10) Patent No.: US 11,718,080 B2
(45) Date of Patent: Aug. 8, 2023

(54) COATED SHEETS FOR IMPROVED ADDITIVE MANUFACTURING PARTS

(71) Applicant: The Boeing Company, Chicago, IL (US)

(72) Inventor: Nishant Sinha, Bangalore (IN)

(73) Assignee: The Boeing Company, Chicago, IL (US)

(*) Notice: Subject to any disclaimer, the term of this patent is extended or adjusted under 35 U.S.C. 154(b) by 576 days.

(21) Appl. No.: 16/737,674

(22) Filed: Jan. 8, 2020

(65) Prior Publication Data

US 2021/0206153 A1    Jul. 8, 2021

(51) Int. Cl.
| | |
|---|---|
| *B32B 37/00* | (2006.01) |
| *B29C 64/124* | (2017.01) |
| *B29C 64/245* | (2017.01) |
| *B29C 64/295* | (2017.01) |
| *B32B 27/28* | (2006.01) |
| *B32B 27/30* | (2006.01) |
| *B33Y 10/00* | (2015.01) |

(52) U.S. Cl.
CPC ........ *B32B 37/0038* (2013.01); *B29C 64/124* (2017.08); *B29C 64/245* (2017.08); *B29C 64/295* (2017.08); *B32B 27/285* (2013.01); *B32B 27/306* (2013.01);
(Continued)

(58) Field of Classification Search
CPC . B32B 37/0038; B32B 27/285; B32B 27/306; B32B 2307/204; B32B 2309/105; B29C 64/124; B29C 64/245; B29C 64/295; B33Y 10/00
See application file for complete search history.

(56) References Cited

U.S. PATENT DOCUMENTS

| | | |
|---|---|---|
| 10,414,147 B2 | 9/2019 | Sweeney et al. |
| 2004/0038611 A1 | 2/2004 | Amou et al. |

(Continued)

FOREIGN PATENT DOCUMENTS

| | | |
|---|---|---|
| CN | 101304816 A | 11/2008 |
| GB | 1167436 A | 10/1969 |

(Continued)

OTHER PUBLICATIONS

Britannica, The Editors of Encyclopaedia, "calendering". Encyclopedia Britannica, Oct. 30, 2007, https://www.britannica.com/technology/calendering. Accessed Oct. 3, 2022. (Year: 2022).*

(Continued)

*Primary Examiner* — Michael M. Robinson
(74) *Attorney, Agent, or Firm* — Quinn IP Law

(57) ABSTRACT

A coated sheet for use in additive manufacturing includes a base polymer layer formed of a base polymer material and a coating polymer layer formed of a coating polymer material. At least the coating polymer material is susceptible to dielectric heating in response to electromagnetic radiation, thereby promoting fusion between adjacent coated sheets during the additive manufacturing process. Specifically, when electromagnetic radiation is applied to at least an interface area between adjacent coated sheets, the polymer coating layer of each coated sheet melts to diffuse across an interface area, thereby preventing formation of voids. The base polymer material and the coating polymer material also may have similar melting points and compatible solubility parameters to further promote fusion between sheets.

20 Claims, 2 Drawing Sheets

(52) U.S. Cl.
CPC ... *B32B 2307/204* (2013.01); *B32B 2309/105* (2013.01); *B33Y 10/00* (2014.12)

(56) References Cited

U.S. PATENT DOCUMENTS

| | | | |
|---|---|---|---|
| 2006/0251826 A1 | 11/2006 | Pfeifer et al. | |
| 2015/0148467 A1 | 5/2015 | Greger et al. | |
| 2016/0200011 A1 | 7/2016 | Rothfuss et al. | |
| 2016/0297104 A1 | 10/2016 | Guillemette et al. | |
| 2017/0072633 A1 | 3/2017 | Hsu | |
| 2017/0173923 A1 | 6/2017 | Davis et al. | |
| 2017/0282628 A1* | 10/2017 | Herlambang | C09D 11/30 |
| 2018/0074231 A1 | 3/2018 | Koenig, II | |
| 2018/0141274 A1 | 5/2018 | Fink et al. | |
| 2019/0366626 A1 | 12/2019 | Swartz et al. | |

FOREIGN PATENT DOCUMENTS

| | | |
|---|---|---|
| GB | 1200890 A | 8/1970 |
| WO | 2011160181 A1 | 12/2011 |
| WO | 2018148359 A1 | 8/2019 |

OTHER PUBLICATIONS

Xia, Weimin & Zhang, Zhicheng. (2018). PVDF-based dielectric polymers and their applications in electronic materials. IET Nanodielectrics. 1. 10.1049/iet-nde.2018.0001. (Year: 2018).*

Ma, Wenzhong & Yuan, Haoge & Wang, Xiao-Lin. (2014). The Effect of Chain Structures on the Crystallization Behavior and Membrane Formation of Poly(Vinylidene Fluoride) Copolymers. Membranes. 4. 243-56. 10.3390/membranes4020243. (Year: 2022).*

Wikipedia contributors. "Polyvinylidene fluoride." Wikipedia, The Free Encyclopedia. Wikipedia, The Free Encyclopedia, Aug. 31, 2022. Web. Oct. 3, 2022. (Year: 2022).*

Search Report for related European Application No. 20217755.6; report dated May 31, 2021.

Search Report for related European Application No. 202117760.6; report dated Jun. 15, 2021.

Search Report for related European Application No. 21150187.9; report dated Jun. 15, 2021.

Anonymous: "Electrical Properties of Plastics", Jul. 17, 2019 (Jul. 17, 2019), XP055808215 Retrieved from the Internet: URL:https://web.archive.org/web/2019071723 2331/https://members.tm.net/lapointe/plast ics.htm [retrieved on May 27, 2021] *the whole document *.

Polymerdatabase: "Prediction of Solubility Parameters A Comparison of four Group Contribution Methods", Jun. 1, 2015 (Jun. 1, 2015), XP055687364, Retrieved from the Internet: URL:http://polymerdatabase.com/pdf/crow_so1parJune2015.pdf [retrieved on Apr. 20, 2020].

Bur et al: "Dielectric properties of polymers at microwave frequencies: a review", Polymer, Elsevier Science Publishers B.V, GB, vol. 26, No. 7, Jul. 1, 1985 (Jul. 1, 1985), pp. 963-977, XP024117585, ISSN: 0032-3861, DOI: 10.1016/0032-3861(85)90216-2 [retrieved on Jul. 1, 1985] * figure 20 *.

* cited by examiner

COATED SHEETS FOR IMPROVED ADDITIVE MANUFACTURING PARTS

FIELD

The present disclosure relates to additive manufacturing apparatus and methods, and particularly to sheet-based additive manufacturing. The additive manufacturing process disclosed herein can be useful in producing parts including environmental control ducts, door panels, tools, jigs, fixtures and the like. Examples of the disclosure may find use in a variety of potential applications, particularly in the transportation industry, including for example, aerospace, marine, automotive, and for example a casing used for auxiliary power units (APUs).

BACKGROUND

Parts and other components may be manufactured using various manufacturing techniques depending on the performance requirements of the parts and the availability of manufacturing equipment. Laminated Object Manufacturing (LOM), for example, is a type of additive manufacturing technique using sheets or layers of metal or plastic. In this process, a first layer is placed on a substrate and selectively fused or compressed. One or more subsequent layers are placed over the first layer and selectively fused or compressed to form a three dimensional object. The sheets or layers used in these processes may be formed of thermoplastic material, such as polycarbonate, metal, or other similarly configured materials. Sheet-based additive manufacturing, such as LOM, may introduce voids between sheets, thereby resulting in an object with reduced structural integrity.

SUMMARY

According to one aspect of the present disclosure, a coated sheet is provided for use in an additive manufacturing process. The coated sheet includes a base polymer layer formed as a first sheet, the base polymer layer being formed of a base polymer material having a first dielectric loss factor, and a coating polymer layer covering at least a portion of a surface of the first sheet, the coating polymer layer being formed of a coating polymer material having a second dielectric loss factor, wherein the second dielectric loss factor of the coating polymer layer is greater than the first dielectric loss factor of the base polymer layer.

According to an additional aspect of the present disclosure, a method of fabricating a coated sheet for use in an additive manufacturing process includes positioning a sheet on a substrate, the sheet being formed of a base polymer material, applying a liquid coating to at least a portion of an exterior of the sheet, the liquid coating being formed of a coating polymer material, and drying the liquid coating on the sheet to form the coated sheet, wherein the coated sheet includes a base polymer layer formed by the sheet, and a coating polymer layer formed by the liquid coating after drying.

According to a further aspect of the present disclosure, a method of fabricating an object by additive manufacturing includes forming a first coated sheet by providing a first sheet formed of a base polymer material, applying a liquid coating to at least a portion of an exterior of the first sheet, the liquid coating being formed of a coating polymer material, and drying the liquid coating on the first sheet to form the first coated sheet, the first coated sheet including a base polymer layer formed by the first sheet and a coating polymer layer formed by the liquid coating after drying. The method further includes forming a second coated sheet by providing a second sheet formed of the base polymer material, applying the liquid coating to at least a portion of an exterior of the second sheet, and drying the liquid coating on the second sheet to form the second coated sheet, the second coated sheet including a base polymer layer formed by the second sheet and a coating polymer layer formed by the liquid coating after drying. The method continues with positioning the first coated sheet relative to the second coated sheet so that the coating polymer layer of the first coated sheet overlies the coating polymer layer of the second coated sheet at an interface area, compressing the first and second coated sheets, and dielectrically heating at least the coating polymer layer of the first coated sheet and the coating polymer layer of the second coated sheet using electromagnetic radiation, thereby to fuse the first coated sheet to the second coated sheet across the interface area.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of illustrative examples of the present disclosure when read in conjunction with the accompanying drawings, wherein:

DETAILED DESCRIPTION

The following detailed description is directed to sheet-based additive manufacturing technologies, such as laminated object manufacturing (LOM). The examples disclosed herein include a coated sheet for use in such processes, methods for forming the coated sheet, and methods for building an object using the coated sheets in an additive manufacturing process. The coated sheets include a base polymer layer formed of a base polymer material and a coating polymer layer formed of a coating polymer material. The coated sheets are susceptible to selective heating, such as dielectric heating through the use of electromagnetic radiation, to improve the strength of the object built.

Definitions

"Fused Filament Fabrication (FFF) is an additive manufacturing technology used for building up of layers to form products and for example, three-dimensional products, prototypes or models. The process can be rapid for quick prototyping and manufacturing to build layer after layer of molten material to create a model, product or like object.

As used herein, the term "filament" refers to feedstock used in an additive manufacturing process that has a slender, threadlike shape.

The term "powder coating" or "powder coated" or the like terms refer to herein as is a type of coating that is applied, for example, as dry powder and usually applied electrostatically and then cured via heat, electromagnetic radiation such as microwave, or other curing source. The powder may be a thermoplastic, a thermoset polymer, or other like polymer or material.

The phrase "Selective Laser Sintering" or "Selective Laser Melting" and like terms, as used herein refers to an additive manufacturing process using a laser to sinter powdered material, pointing the laser into space, and using a 3D model as the pattern, binding the material together to create a solid structure. Usually, the powdered material is nylon, polyamide or like materials.

The phrase "Laminated Object Manufacturing (LOM)" refers to a process wherein layers of material, such as plastic or paper or the like, are fused, pressed, laminated, or the like, together using heat and pressure. The product can then be sliced or cut into the desired shape with a computer-controlled laser, blade, knife or other cutting tool.

References are made to the accompanying drawings that form a part hereof, and which are shown by way of illustration, specific embodiments, or examples Like numerals represent like elements through the several figures.

Figure 1:
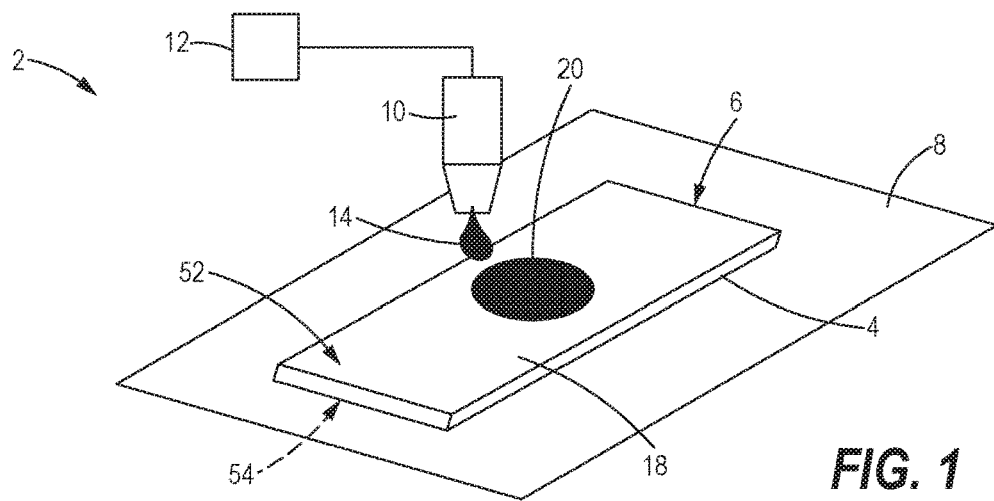
FIG. 1 is a diagrammatic illustration of apparatus for converting a first sheet into a coated sheet for use in a sheet-based additive manufacturing process, according to the present disclosure.

Turning now to the figures, FIG. 1 illustrates an apparatus 2 for converting a first sheet 4 into a coated sheet 6 that can be used in an additive manufacturing process to build an object having improved structural integrity. Specifically, the first sheet 4 is placed on a substrate 8, which may be a workstation of an additive manufacturing apparatus. A nozzle 10 is positioned adjacent the substrate 8 and is fluidly coupled to a coating supply 12 holding a liquid coating 14. In operation, the coating supply is operated to spray the coating 14 over at least a portion of an exterior of the first sheet 4. The liquid coating 14 may be supplied in a liquid phase that subsequently dries and hardens over the first sheet 4. Ultimately, the apparatus 2 produces the coated sheet 6 having a base polymer layer 18 and a coating polymer layer 20.

The materials used to form the base polymer layer 18 and the coating polymer layer 20 of the coated sheet 6 permit selective heating during a sheet-based additive manufacturing process, thereby promoting inter-layer chain diffusion and bonding so that the resulting build object has improved structural integrity. As discussed in greater detail below, the materials used for the base polymer layer 18 and the coating polymer layer 20 may be selected based on relative responsiveness to dielectric heating, as well as proximity of melting points and solubility parameters.

Regarding responsiveness to dielectric heating, materials used in the coated sheet 6 may be selected so that the coating polymer layer 20 is more susceptible to heating in response to electromagnetic radiation than the base polymer layer 18. A property known as dielectric loss factor (which is also known as the dissipation factor and is represented by the symbol tan δ) quantifies a material's ability to dissipate applied electromagnetic energy in the form of heat. A material with a higher dielectric loss factor will heat up more in response to an applied electromagnetic field than a material with a lower dielectric loss factor. To focus heating at the external surface of the coated sheet 6, the coating polymer layer 20 is formed of a coating polymer material having a higher dielectric loss factor than a base polymer material used for the base polymer layer 18. In some examples, the coating polymer material has a tan δ value at least about 50 times the tan δ value of the base polymer material. Additionally or alternatively, the base polymer material has a tan δ value less than 0.05 and the coating polymer material may have a tan δ greater than 0.05.

The coated sheet 6 further may use materials for the base polymer layer 18 and the coating polymer layer 20 that have similar melting points, which improves strength of the build object formed by multiple coated sheets that are stacked during the additive manufacturing process. As noted above, the coating polymer material has a higher dielectric loss factor, and therefore generates heat directly in response to the application of electromagnetic energy. The base polymer material may be selected so that it has a melting point that is proximate to that of the coating polymer material, so that heating of the coating polymer layer 20 by the electromagnetic energy will, in turn, heat at least an outer portion of the base polymer layer 18. This indirect heating of the base polymer layer 18 causes the base polymer layer 18 to remain in the softened and/or molten state for a longer period of time, thereby promoting increased diffusion and bonding between adjacent coated sheets 6 stacked on the substrate. The melting points of the base polymer material and the coating polymer material preferably permit formation of a solid and liquid morphology. In some examples, the base polymer material has a first melting point, the coating polymer material has a second melting point, and the first melting point of the base polymer material is within 20 degrees Celsius of the of the second melting point of the coating polymer material. Materials with melting points within about 20 degrees, or about 18 degrees, or about 15 degrees Celsius have been found to generate sufficient heat to prolong the molten state of the base polymer layer 18 to promote diffusion and bonding between adjacent beads of coated sheet 6 deposited and heated during additive manufacturing.

The materials selected for the base polymer layer 18 and the coating polymer layer 20 further may have compatible solubility parameters, further promoting bonding between adjacent coated sheets 6 when used in the additive manufacturing process. For example, the coating polymer material may be immiscible with the base polymer material to prevent phase separation and promote fusion of the base polymer layers of adjacent coated sheets 6 during additive manufacturing. In some examples, the base polymer material has a first solubility parameter, the coating polymer material has a second solubility parameter, and the second solubility parameter is within about 10 $J/cc^{0.5}$ of the first solubility parameter. Materials with solubility parameters within about 10 $J/cc^{0.5}$, or about 8 $J/cc^{0.5}$, or about 5 $J/cc^{0.5}$ of each other have been found to advantageously promote intermixing when heated during the additive manufacturing process.

In view of the foregoing considerations, suitable base polymer materials include polyethylene, polyethylene terephthalate, polypropylene, polyamides, polyetheretherketone, polyphenylene sulphide, polyetherimide, polystyrene, acrylonitrile/butadiene/styrene, polyacrylates, polyacrylonitrile, polycarbonate, or any mixture thereof.

Suitable coating polymer materials include polyvinyl alcohol, polyvinylidene fluoride, polyurethane, polyamide imide, polyamide, polyvinyl chloride, acrylic, cellulose esters, or mixtures thereof. Other examples of suitable coating polymer materials include materials and solvents that contain —OH, —NH, C=O, —N=O functional groups with a high dielectric loss factor. Further examples of suitable coating polymer materials include polyacrylonitrile (tan δ=0.1 at 60 Hz), polyethylene glycol, or mixtures thereof. In some examples, the coating polymer material is particularly responsive to electromagnetic energy in a specific frequency range, such as microwave energy in the GHz range.

TABLE 1 compares the dielectric loss factors, melting points, and solubility parameters for a specific example in which the coating polymer material is polyvinyl alcohol and the base polymer material is Ultem™ 1010 (polyetherimide):

TABLE 1

| Material | tan δ | Tm/Tg (degrees Celsius) | Solubility Parameter $(J/cc^{0.5})$ |
|---|---|---|---|
| Ultem ™ 1010 (polyetherimide) | 0.001 | 186 | 28 |
| Polyvinyl Alcohol | 0.185 | 200 | 24 |

In this example, the use of Ultem™ 1010 (polyetherimide) as the base polymer material and polyvinyl alcohol as the coating polymer material is advantageous because polyvinyl alcohol has a high dielectric loss factor (tan δ=0.185 in the MHz-GHz frequency range), relative to Ultem™ 1010 (tan δ=0.001 in the MHz-GHz frequency range), the melting points of the two materials are 14 degrees Celsius apart, and the solubility parameters are close, indicating compatibility.

In addition to chemical characteristics, the base polymer layer 18 and the coating polymer layer 20 further may have physical characteristics that indicate suitability promoting fusion, bonding, and intermixing. For example, the base polymer layer 18 may have a thickness within a range of about 0.1 to about 5 millimeters, or within a range of about 0.5 to about 4 millimeters, or within a range of about 1 to about 3 millimeters. The coating polymer layer 20 may have a thickness within a range of about 1 micron to about 1000 microns, or within a range of about 50 microns to about 750 microns, or within a range of about 100 microns to about 300 microns. Additionally, the liquid coating 14 may be characterized as having a viscosity of from about 0.1 to about 10 Pascal-seconds (Pa·s), or from about 0.5 to about 8 Pa·s, or from about 1 to about 5 Pa·s.

In conventional sheet-based additive manufacturing techniques, first and second uncoated sheets are stacked and fused together using compression and/or sintering. Successive uncoated sheets may be stacked and compressed/sintered until the stack of uncoated sheets has a desired height. The fused stack of uncoated sheets may then be cut, such as by laser, to form the final object with the desired shape. Due to the properties of conventional uncoated sheets, compression and/or sintering of adjacent uncoated sheets may create voids between the uncoated sheets, which weaken the object.

FIGS. 1-6 illustrate an example of a method for forming an object 50 using coated sheets 6, according to the present disclosure. As noted above, FIG. 1 shows the first sheet 4 formed of the base polymer material positioned on the substrate 8. In the illustrated example, the first sheet 4 has substantially planar top and bottom surfaces 52, 54. The first sheet 4 further is formed in a rectangular shape, however the sheet may have other shapes. The nozzle 10 is positioned over the top surface 52 of the first sheet 4 and dispenses the coating 14 over at least a portion of the first sheet 4. When the coating 14 dries, the first sheet 4 is converted into a first coated sheet 56 having a base polymer layer 18 and a coating polymer layer 20.

Figure 2:
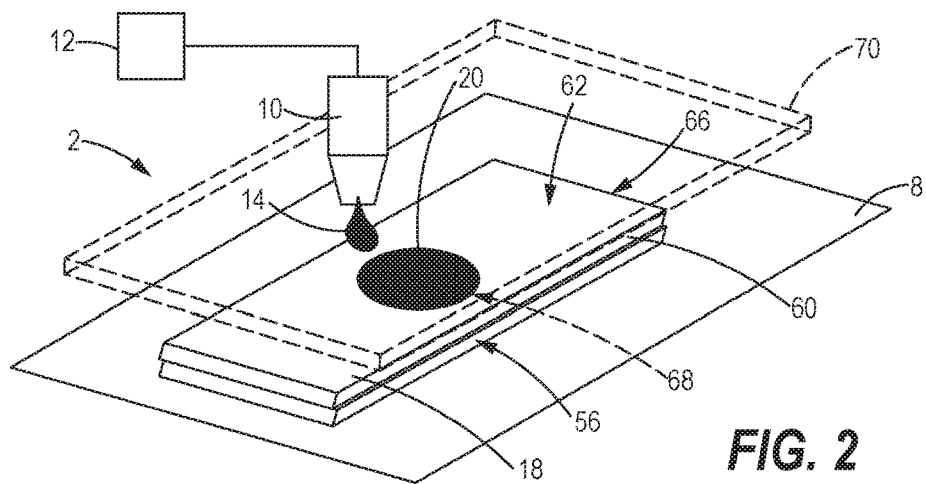
FIG. 2 is a diagrammatic illustration of converting a second sheet into a coated sheet.

Turning to FIG. 2, a second sheet 60 of base polymer material is placed on top of the first sheet 4. Coating 14 is applied to at least a portion of a top surface 62 of the second sheet and is dried to convert the second sheet 60 to a second coated sheet 66 having a base polymer layer 18 and a coating polymer layer 20. The shape of the second sheet 60 may match the shape of the first sheet 4, or may have a different shape. Additionally, in this example the first coated sheet 56 is positioned relative to the second coated sheet 66 so that the coating polymer layer 20 of the first coated sheet 56 overlies the coating polymer layer 20 of the second coated sheet 66 at an interface area 68. While the coating polymer layers 20 are shown in a fully aligned configuration in FIG. 2, in other embodiments the coating polymer layers 20 may be partially offset from one another.

Figure 3:
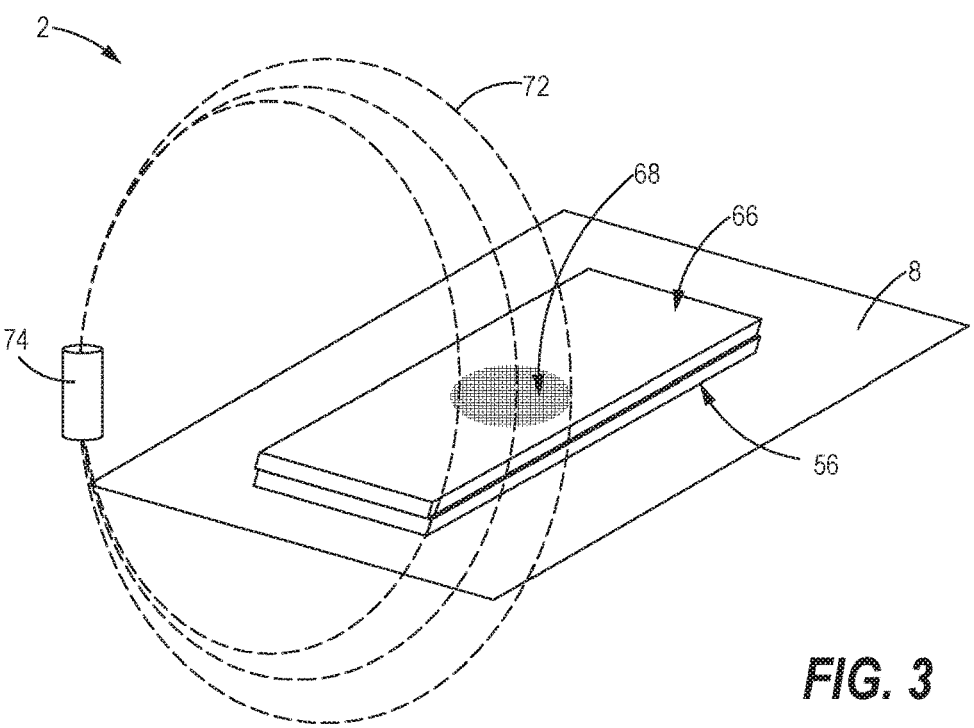
FIG. 3 is a diagrammatic illustration showing the second sheet of FIG. 2 placed over the first sheet of FIG. 1 and applying electromagnetic radiation to fuse the first and second sheets at an interface area.

Compression/sintering may be used in combination with dielectric hating to intimately fuse together the first and second coated sheets 56, 66. With the first and second coated sheets 56, 66 positioned as shown in FIG. 2, the sheets may be compressed by a press 70 (shown in phantom lines) in a conventional manner to initially fuse the sheets together as shown in FIG. 3. To strengthen the bond between the first and second coated sheets 56, 66, electromagnetic radiation 72 is applied to at least the interface area 68. In the illustrated example, the electromagnetic radiation 72 is applied by a heating source 74, which not only directs the electromagnetic radiation 72 to the interface area 68 but also controls the duration during which the electromagnetic radiation 72 is applied, in order to strengthen localized areas of the coated sheets 56, 66. At least the coating polymer layers 20 of the first and second coated sheets 56, 66 will dielectrically heat in response to the electromagnetic radiation 72. The electromagnetic radiation 72, in one example, can be microwaves having frequencies in a range between about 300 MHz and about 300 GHz. In this example, the coating polymer material has a high dielectric loss factor and is susceptible to microwave radiation, and thus dielectric heating.

Because the coating polymer material has a higher dielectric loss factor, and the base polymer material has a lower dielectric loss factor, a frequency of the electromagnetic radiation may be selected so that only the coating polymer layer 20 is melted directly in response to the electromagnetic radiation. Additionally, the base polymer material may have a melting point near that of the coating polymer material, so that the base polymer layer 18 at least partially melts in response to heating of the coating polymer layer 20. Thus, the coating polymer layer 20 will directly melt and the base polymer layer 18 will indirectly melt in response to the electromagnetic radiation 72. In other examples, the electromagnetic radiation 72 may directly heat both the coating polymer layer 20 and the base polymer layer 18. In either case, melted portions of the base polymer layers 18 of the first and second coated sheets 56, 66 fuse together, further preventing formation of voids between the sheets and promoting structural integrity of the object built.

In examples where the coating polymer material and the base polymer material have compatible solubility parameters (see the non-limiting example in Table 1), melting of both the coating polymer layer 20 and the base polymer layer 18 creates a homogenous mixture, and therefore no phase separation occurs when the melted layers subsequently cool and harden.

Figure 4:
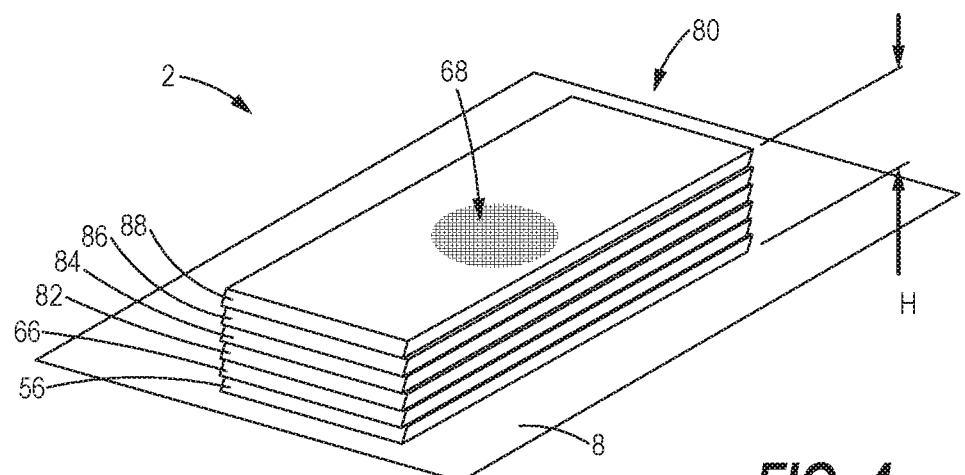
FIG. 4 is a diagrammatic representation of multiple coated sheets stacked and fused together.

Additional coated sheets may be added on top of the first and second coated sheets 56, 66 to form a sheet stack 80 having sufficient dimensions for the final build object. As best shown in FIG. 4, a third coated sheet 82, a fourth coated sheet 84, a fifth coated sheet 86, and a sixth coated sheet 88 are stacked on top of the first and second coated sheets 56, 66, so that the resulting sheet stack 80 has a desired height dimension "H". For each additional coated sheet, the method may include compressing the stack of coated sheets using the press 70 and dielectrically heating at least the coating polymer layer 20 with electromagnetic radiation 72 from the heating source 74.

Figure 5:
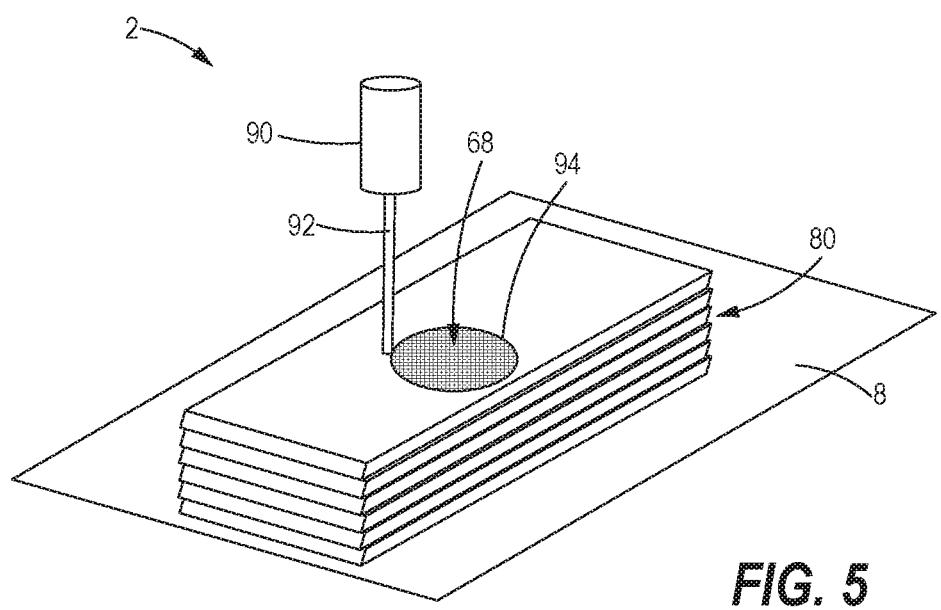
FIG. 5 is a diagrammatic illustration of cutting the stack of coated sheets of FIG. 4 with a laser.
Figure 6:
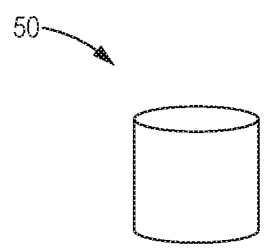
FIG. 6 is an illustration of object formed after cutting the stack of sheets shown in FIG. 5.

After the coated sheets are fused together, the sheet stack 80 may be cut to form the object 50 with the desired shape. As best shown in FIG. 5, a laser cutter 90 produces an energy beam 92 that cuts through at least the fused portions of the sheet stack 80. In the illustrated embodiment, the laser cutter 90 traces a circular cut pattern 94 around the fused portions of the sheet stack 80, thereby to give the object a cylindrical shape as best shown in FIG. 6. It will be appreciated that the cut pattern 94 may have different shapes other than circular to obtain the desired final shape for the build object 50, as shown in FIG. 6. The resulting object 50 has no voids between the coated sheets 56, 66, 82, 84, and 86.

It should be understood that the drawings are not necessarily drawn to scale and that the disclosed examples are sometimes illustrated schematically. It is to be further appreciated that the following detailed description is merely exemplary in nature and is not intended to limit the disclosure the application and uses thereof. Hence, although the present disclosure is, for convenience of explanation, depicted and described as certain illustrative examples, it will be appreciated that it can be implemented in various other types of examples and in various other systems and environments.

What is claimed is:

1. A method of fabricating a coated sheet for use in an additive manufacturing (AM) process, the method comprising:
    positioning a sheet on a substrate, the sheet being formed of a base polymer material having a first dielectric loss factor with a first tan value in a predefined microwave frequency range;
    applying a liquid coating to at least a portion of an exterior of the sheet, the liquid coating being formed of a coating polymer material distinct from the base polymer material and having a second dielectric loss factor with a second tan value in the predefined microwave frequency range, the second tan value being substantially larger than the first tan value of the base polymer material and thereby more susceptible to heating in response to electromagnetic energy than the base polymer material during the AM process;
    drying the liquid coating on the sheet to form the coated sheet; and
    forming an object using the coated sheet in the AM process,
    wherein the coated sheet includes a base polymer layer formed by the sheet, and a coating polymer layer formed by the liquid coating after drying the liquid coating.

2. The method of claim 1, in which applying the liquid coating to at least the portion of the exterior of the sheet comprises spraying the liquid coating from a nozzle positioned adjacent the substrate.

3. The method claim 1, in which the second tan value of the second dielectric loss factor of the coating polymer material is at least about 50 times greater than the first tan value of the first dielectric loss factor of the base polymer material in the predefined microwave frequency range.

4. The method of claim 1, in which:
    the base polymer material has a first melting point;
    the coating polymer material has a second melting point; and
    the first melting point is within about 20 degrees Celsius of the second melting point.

5. The method of claim 1, in which:
    the base polymer material has a first solubility parameter;
    the coating polymer material has a second solubility parameter; and
    the second solubility parameter is within about 10 $(J/cc)^{0.5}$ of the first solubility parameter.

6. The method of claim 1, in which the base polymer material comprises polyetherimide and the coating polymer material comprises polyvinyl alcohol.

7. The method of claim 1, in which the base polymer layer has a thickness of from about 0.1 to about 5 millimeters, and the coating polymer layer has a thickness of from about 1 to about 1,000 microns.

8. The method of claim 1, wherein the first tan value of the first dielectric loss factor of the base polymer material is less than 0.05, and wherein the second tan value of the second dielectric loss factor of the coating polymer material is greater than 0.05.

9. The method of claim 4, wherein the first and second melting points permit formation of a solid and liquid morphology.

10. The method of claim 1, wherein the coating polymer material is immiscible with the base polymer material thereby preventing phase separation and promoting fusion of the base polymer layer with adjacent beads of the liquid coating.

11. The method of claim 1, wherein the coating polymer material includes a material or solvent containing at least one of —OH, —NH, C═O, or —N═O functional groups.

12. A method of fabricating an object by additive manufacturing, the method comprising:
    forming a first coated sheet by:
        providing a first sheet formed of a base polymer material having a first dielectric loss factor with a first tan value in a predefined microwave frequency range;
        applying a liquid coating to at least a portion of an exterior of the first sheet, the liquid coating being formed of a coating polymer material distinct from the base polymer material and having a second dielectric loss factor with a second tan value in a predefined microwave frequency range, the second tan value being substantially larger than the first tan value of the base polymer material and thereby more susceptible to heating in response to electromagnetic energy than the base polymer material during the AM process; and
        drying the liquid coating on the first sheet to form the first coated sheet, the first coated sheet including a base polymer layer formed by the first sheet and a coating polymer layer formed by the liquid coating after drying the liquid coating;

forming a second coated sheet by:
   providing a second sheet formed of the base polymer material;
   applying the liquid coating to at least a portion of an exterior of the second sheet; and
   drying the liquid coating on the second sheet to form the second coated sheet, the second coated sheet including a base polymer layer formed by the second sheet and a coating polymer layer formed by the liquid coating after drying the liquid coating;
positioning the first coated sheet relative to the second coated sheet so that the coating polymer layer of the first coated sheet overlies the coating polymer layer of the second coated sheet at an interface area;
compressing the first and second coated sheets; and
forming an object using the first and second coated sheets in the AM process, including dielectrically heating at least the coating polymer layer of the first coated sheet and the coating polymer layer of the second coated sheet using electromagnetic radiation, thereby to fuse the first coated sheet to the second coated sheet across the interface area.

13. The method of claim 12, in which the second tan value of the second dielectric loss factor of the coating polymer material is at least about 50 times greater than the first tan value of the first dielectric loss factor of the base polymer material in a predefined microwave frequency range.

14. The method of claim 12, in which:
the base polymer material has a first melting point;
the coating polymer material has a second melting point; and
the first melting point is within about 20 degrees Celsius of the second melting point.

15. The method of claim 12, in which:
the base polymer material has a first solubility parameter;
the coating polymer material has a second solubility parameter; and
the second solubility parameter is within about 10 $(J/cc)^{0.5}$ of the first solubility parameter.

16. The method of claim 12, in which the base polymer material comprises polyetherimide and the coating polymer material comprises polyvinyl alcohol.

17. The method of claim 12, further comprising, after dielectrically heating at least the coating polymer layer of the first coated sheet and the coating polymer layer of the second coated sheet, cutting the first coated sheet and the second coated sheet to shape the object.

18. The method of claim 12, in which dielectrically heating at least the coating polymer layer of the first coated sheet and the coating polymer layer of the second coated sheet comprises applying electromagnetic radiation in a microwave range of frequencies.

19. The method of claim 12, wherein the first dielectric loss factor of the base polymer material has a first tan value less than 0.05 and the second dielectric loss factor of the coating polymer material has a second tan value greater than 0.05.

20. The method of claim 14, wherein the first and second melting points permit formation of a solid and liquid morphology.

\* \* \* \* \*